(12) United States Patent
Tonooka

(10) Patent No.: US 6,995,904 B2
(45) Date of Patent: Feb. 7, 2006

(54) STEREO MICROSCOPE

(75) Inventor: Masahito Tonooka, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 120 days.

(21) Appl. No.: 10/315,865

(22) Filed: Dec. 10, 2002

(65) Prior Publication Data

US 2003/0137724 A1 Jul. 24, 2003

(30) Foreign Application Priority Data

Dec. 13, 2001 (JP) .............................. 2001-380387

(51) Int. Cl.
*G02B 21/06* (2006.01)
(52) U.S. Cl. ..................................... 359/390; 359/388
(58) Field of Classification Search ................ 359/368, 359/372, 374–377, 382, 383, 385, 388, 390
See application file for complete search history.

(56) References Cited

U.S. PATENT DOCUMENTS

| | | | | |
|---|---|---|---|---|
| 3,186,296 A | * | 6/1965 | Erban | 356/237.2 |
| 3,637,283 A | * | 1/1972 | Tasaki et al. | 359/376 |
| 3,790,249 A | * | 2/1974 | Treace | 359/388 |
| 4,148,552 A | * | 4/1979 | Suzuki et al. | 359/388 |
| 4,284,327 A | * | 8/1981 | Kraft et al. | 359/388 |
| 5,325,231 A | * | 6/1994 | Tamura et al. | 359/387 |
| 5,920,425 A | * | 7/1999 | Yoo et al. | 359/390 |
| 6,347,009 B1 | * | 2/2002 | Takeuchi | 359/385 |
| 6,493,134 B2 | * | 12/2002 | Pensel | 359/388 |
| 6,543,914 B2 | * | 4/2003 | Sander | 362/401 |
| 6,717,725 B2 | * | 4/2004 | Ganser | 359/385 |
| 2001/0012150 A1 | * | 8/2001 | Kawahito | 359/368 |

FOREIGN PATENT DOCUMENTS

| | | |
|---|---|---|
| JP | 11-084257 A | 3/1999 |
| JP | 2000-098246 A | 4/2000 |

* cited by examiner

*Primary Examiner*—Mark A. Robinson
(74) *Attorney, Agent, or Firm*—Frishauf, Holtz, Goodman & Chick, P.C.

(57) ABSTRACT

Disclosed herein is a stereomicroscope. The stereomicroscope comprises a microscope main body, a stand including a stand base portion on which a sample is to be laid, a support disposed vertically on the stand base portion, a focus adjust portion attached so as to be movable along the support, and an arm portion connected to the focus adjust portion for connecting the microscope main body thereto, so that the microscope main body is mounted on the stand to focus the sample, a light source lamp which illuminates the sample, and a light source unit in which the light source lamp is contained and which is attachable to at least one of the stand base portion, the support, and the arm portion.

27 Claims, 9 Drawing Sheets

STEREO MICROSCOPE

CROSS REFERENCE TO RELATED APPLICATION

This application is based upon and claims the benefit of priority from the prior Japanese Patent Application No. 2001-380387, filed Dec. 13, 2001, the entire contents of which are incorporated herein by reference.

BACKGROUND OF THE INVENTION

1. Field of the Invention

The present invention relates to a stereomicroscope which includes an illuminating apparatus.

2. Description of the Related Art

In general, a stereomicroscope has a zoom portion and focus portion that can be separated from each other. Furthermore, stereomicroscopes have been variously modified to improve operational efficiency. A technique is known, in which a fiber illuminating apparatus comprising a fiber having a small tip is employed to illuminate a sample to be observed by the stereomicroscope.

The use of this fiber illuminating apparatus makes it unnecessary for the stereomicroscope to have large-sized light source heretofore. Thus, more space is available around the sample, which improves the operability of the stereomicroscope.

When the fiber illuminating apparatus is used, applying light to the sample, the loss intensity of light illuminating the sample will decrease if the light source unit including a light source applying light to the fiber is locate far away from the sample. Therefore, the sample cannot be illuminated enough to be observed well, unless the light source unit is increased in size and output. If a large, high-output light source is used, not only the cost of installing the light source unit will increase, but also the handling of the fiber will be cumbersome.

The light source unit that is used to achieve the illumination using the fiber illuminating apparatus is designed for exclusive use. Therefore, for example, when the sample is observed by transmitted illumination without using any fiber, a light source for transmitted illumination must be used in addition to the light source unit.

Furthermore, to observe a sample having an excessively low reflectance, more light is required. In this case, the fiber can hardly be used. However, if the fiber is not used, the light source unit for applying light through the fiber has to be held and adjusted so as to directly illuminate the sample.

Hitherto, various light sources must be prepared to illuminate samples well in various illuminating methods, respectively. Among the various illuminating methods are: a method that uses a fiber to perform oblique illumination; a method in which light is directly applied to the sample from the light source to perform the oblique illumination, without using the fiber; and a method that perform transmitted illumination.

BRIEF SUMMARY OF THE INVENTION

According to one aspect of the present invention, there is provided a stereomicroscope comprising: a microscope main body; a stand including a stand base portion on which a sample is to be laid, a support disposed vertically on the stand base portion, a focus adjust portion which is attached so as to be movable along the support, and an arm portion connected to the focus adjust portion for connecting the microscope main body thereto, so that the microscope main body is mounted on the stand to focus the sample; a light source lamp which illuminates the sample; and a light source unit in which the light source lamp is contained and which is attachable to at least one of the stand base portion, the support, and the arm portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
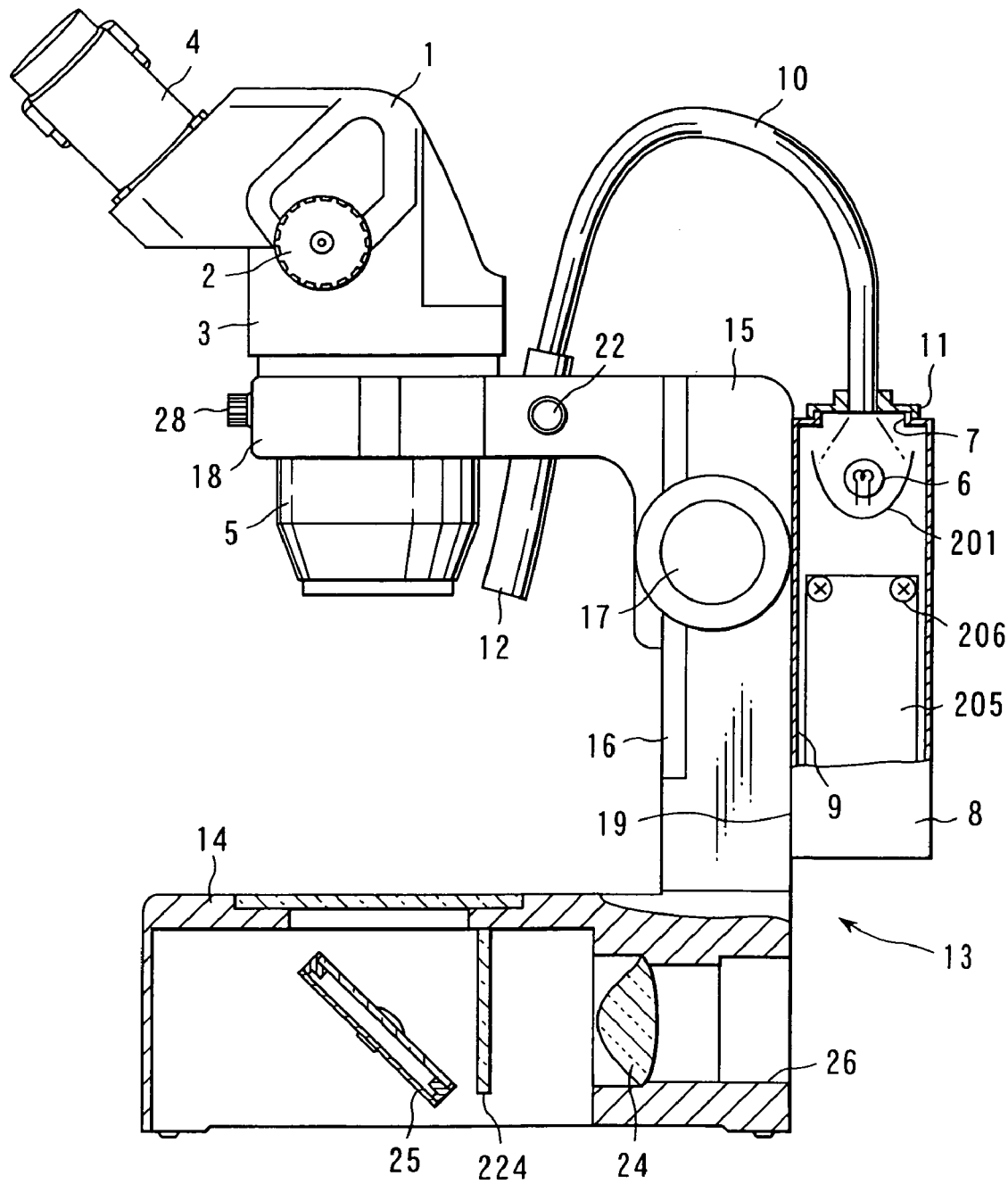
FIG. 1 is a side view showing a stereomicroscope according to a first embodiment of the present invention.
Figure 2:
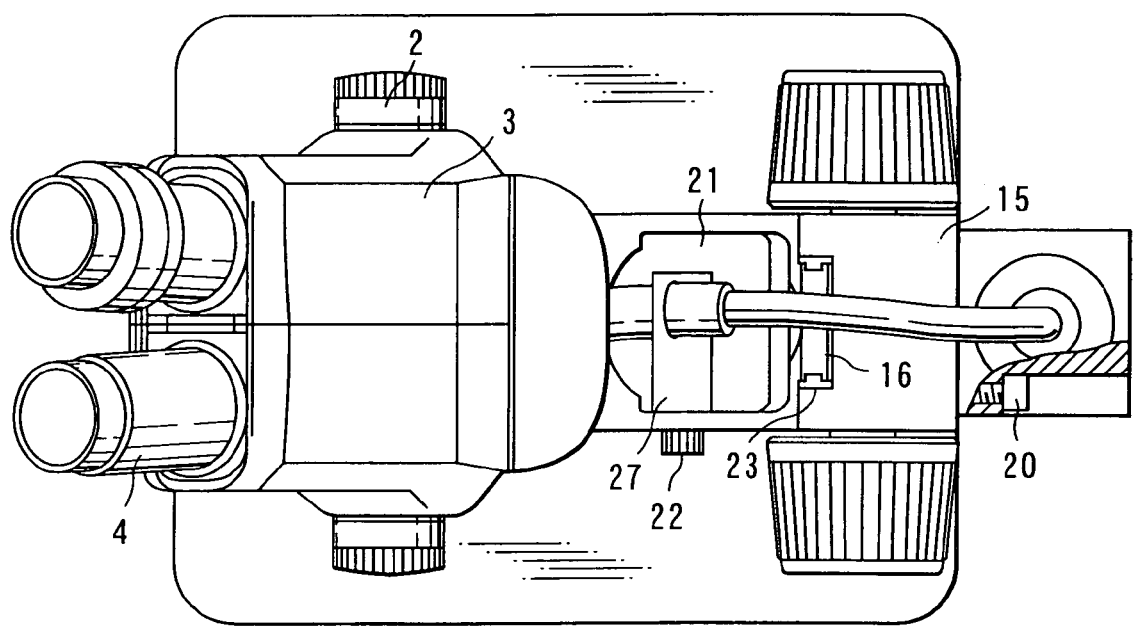
FIG. 2 is a plan view of the stereomicroscope according to the first embodiment of the invention.

FIGS. 1 and 2 are a side and plan views, respectively, showing a stereomicroscope according to the first embodiment of the present invention. The stereomicroscope will be described, with reference to FIGS. 1, 2.

The stereomicroscope comprises a microscope main body 1 and stand 13, which can be separated from each other. It further comprises a light source unit 8 that is connected to the stand 13 and can be removed therefrom.

The stereomicroscope has a main body 1. The main body 1 contains a zoom portion 3 and an eyepiece portion 4. The zoom portion 3 includes an objective lens 5 and zoom handle 2.

The objective lens 5 is positioned, opposing a sample. The zoom handle 2 is operated to magnify an image of the sample. The microscope user observes the sample through the eyepiece portion 4.

The stand 13 comprises a base portion 14, support 15, focus adjust portion 16, and focus handle 17. The support 15 is mounted on the base portion 14.

The focus adjust portion 16 is attached to the support 15 and can be vertically movable. When manipulated, the focus handle 17 moves the focus adjust portion 16 up and down.

The focus adjust portion 16 includes an arm portion 18 for connecting the focus adjust portion 16 to the microscope main body 1, and a knob 28 for fixing the microscope main body 1 onto the arm portion 18.

The focus adjust portion 16 is attached to the support 15 by a guide 23. The guide 23 comprises a roller guide, ball guide, and slide dovetail. The guide 23 can move the portion 16 vertically, with respect to the support 15. The guide 23 can be so moved by, for example, using a rack and pinion to rotate the focus handle 17. The rack-pinion mechanism can adjust the distance between the objective lens 5 and the sample placed on the stand base portion 14, to bring the sample to the focal point of the objective lens 5.

The stand base portion 14 includes a lens 24, Fresnel lens 224, mirror 25, transmitted illumination attaching portion 26, and fixed knob (not shown).

The transmitted illumination attaching portion 26 is designed to hold a light source. In the transmitted illumination attaching portion 26, the light source is fixed by the fixed knob. The lens 24 and Fresnel lens 224 guide light from the light source for the transmitted illumination. The mirror 25 reflects the light upwards.

The light source unit 8 comprises a light source 6, fiber 10, reflector 201, and fiber introducing portion 7.

The reflector 201 collects the light from the light source 6 at one end of the fiber 10 and efficiently applies the light into the fiber 10. The fiber 10 guides the light to the sample. A light source unit attaching portion 11 is provided on one end of the fiber 10. The portion 11 is attached to the fiber introducing portion 7; it can be removed from the portion 7. The portion 11 fiber tip end 12 is provided on the other end of the fiber 10, holding the fiber 10 such that the light beam emitted from the fiber travels in a desired direction. The light source 6 incorporates a halogen lamp in the present embodiment.

Figure 3:
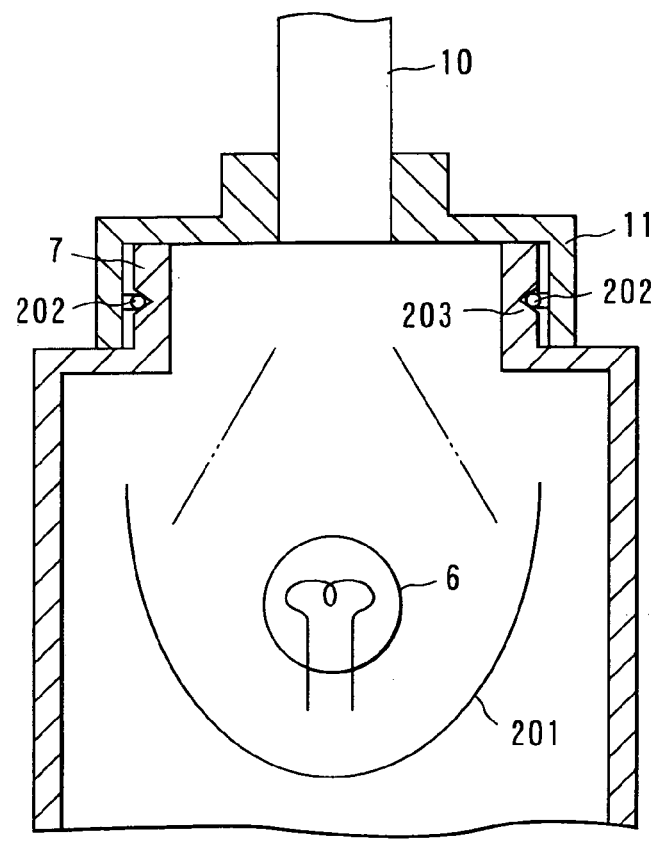
FIG. 3 is a diagram showing the junction between the fiber introducing portion and the light source unit attaching portion, both incorporated in the stereomicroscope.
Figure 4:
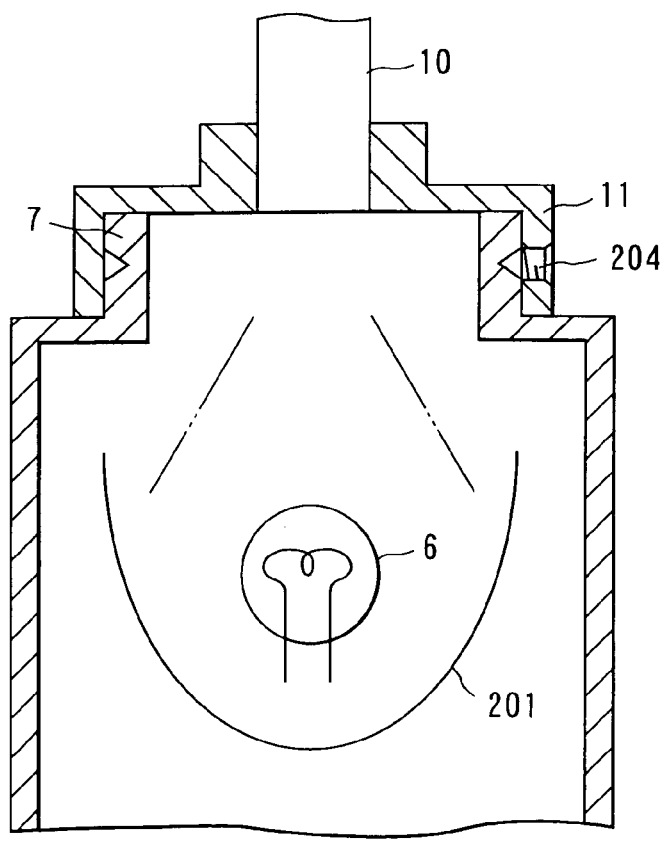
FIG. 4 is another diagram depicting the junction between the fiber introducing portion and the light source unit attaching portion.

The fiber introducing portion 7 and light source unit attaching portion 11 may include screw portions so that they may be detached from each other. Alternatively, a magnet may be used to couple the portions 7 and 11 together. As shown in FIG. 3, the light source unit attaching portion 11 incorporates a spring 202 and the outer periphery of the cylindrical fiber introducing portion 7 has a V groove 203. As long as the spring 202 remains clamped in the V groove 203, the light source unit attaching portion 11 may be detachable. As shown in FIG. 4, a screw 204 may be used to fix the unit. In this case, the light source unit attaching portion 11 is detachable.

A clamp screw 206 fastens a power source substrate 205 to the bottom of the light source 6 of the light source unit 8. The substrate 205 is provided to supply power to the light source 6.

A method of connecting the stand 13 to the light source unit 8 will be described.

A stand attaching portion 9 is provided on the back of the light source unit 8. That is, the portion 9, which will be attached to the support 15, lies in a surface that opposes the light source unit 8.

The support 15 includes a mounting portion 19 that supports the light source unit 8 so that the unit may be detached. To attach the light source unit 8 to the support 15, the stand attaching portion 9 of the light source unit 8 is first aligned with the mounting portion 19 of the support 15 and then fixed with screws. The fixing means is not limited to screws, nonetheless. For example, a hook or magnet may be used instead, to mount the light source unit 8 on the stand base portion 14. The light source unit 8 may be bonded, if it needs to be permanently fixed.

As FIG. 2 shows, the arm portion 18 has an opening 21 that allows passage of the fiber tip end 12 and light source unit 8. A fixing member 22 is provided on one side of the arm portion 18. A fiber attaching member 27 is held in the opening 21, secured to the fixing member 22. Thus held in the opening 21, the member 27 holds the fiber tip end 12 so that the light beam emitted from the fiber may travel to the sample.

Various illuminating methods using the stereomicroscope of the first embodiment will be described below.

A method that uses a fiber illuminating apparatus to perform oblique illumination will be described, with reference FIGS. 1 and 2. First, the light source unit attaching portion 11 of the fiber 10 is secured to the fiber introducing portion 7 of the light source unit 8. The stand attaching portion 9 of the light source unit 8 is aligned with the mounting portion 19 of the support 15 and fixed by the screws. Then, the fiber tip end 12 is passed through the opening 21 made in the arm portion 18. Further, the fiber 10 is adjusted in position so that the light beam emitted from it may travel to the sample. Finally, the fixing member 22 is manipulated, holding the fiber attaching member in the opening 21. As a result, the fiber tip end 12 is fixed in position in the opening 21.

A method that uses the light source 6, but not the fiber 10, to perform transmitted illumination will be described, with reference to FIG. 5. At first, the light source unit attaching portion 11 on the fiber end is detached from the fiber introducing portion 7 of the light source unit 8. Next, the fiber introducing portion 7 of the light source unit 8 is attached to the transmitted illumination light source attaching portion 26.

A method that uses the light source 6, but not the fiber 10, to perform oblique illumination will be described, with reference to FIG. 6. The fiber 10 is detached from the light source unit 8. Then, the fixing member 22 is manipulated, holding the light source unit 8 in the opening 21 such that the light beam emitted extends to the sample. As shown in FIG. 2, the opening 21 has a shape conforming to the shape of the light source unit 8. Hence, not only the fiber 10, but also the light source unit 8 can be held in the opening 21.

The first embodiment is characterized in that the light source unit 8 is attached to the back of the stand 13 of the stereomicroscope, not spaced apart from the stereomicroscope as in the conventional method.

The light source unit 8 is therefore located closer to the sample than in the conventional method. This helps to shorten the fiber 10. As a result, the loss of the light amount can be reduced. In other words, a sufficient amount of light can be applied to the sample to achieve good observation of the sample, even the lamp used is a small, low-output one.

Moreover, the unit does not obstruct the observation of the sample, because the light source unit 8 is attached to the stand 13.

While the light source unit 8 remains attached to the stand 13, heat from the light source may be transferred to, and propagate through, the stand 13. Even in this case, the observation of the sample is not influenced, though some deflection occurs. This is because the stereomicroscope has a large focal depth. Therefore, the light source unit 8 does not need a cooling fan. This helps to achieve further miniaturization of the light source unit 8. If necessary, ventilation holes may be cut in the bottom of the light source unit 8.

In the first embodiment, the light source unit 8 is provided in the support 15. Nevertheless, this invention is not limited to this structure. For example, the light source unit 8 may be is attached to the left side, right side, front, or back of the stand base portion 14. In this case, the advantage is achieved as in the first embodiment.

If the light source unit 8 is made as small as possible, the light source unit 8 can be attached at more positions than otherwise and is less likely to obstruct the operation of the sample. The light source unit 8 of the first embodiment is elongated, extending vertically, with the power source substrate 205 positioned under the light source 6 and reflector 201. The light source unit 8 is therefore less broad than otherwise. This meets the requirement that the unit be attached and detached at many positions and that a sufficient operation space be provided.

Figure 7:
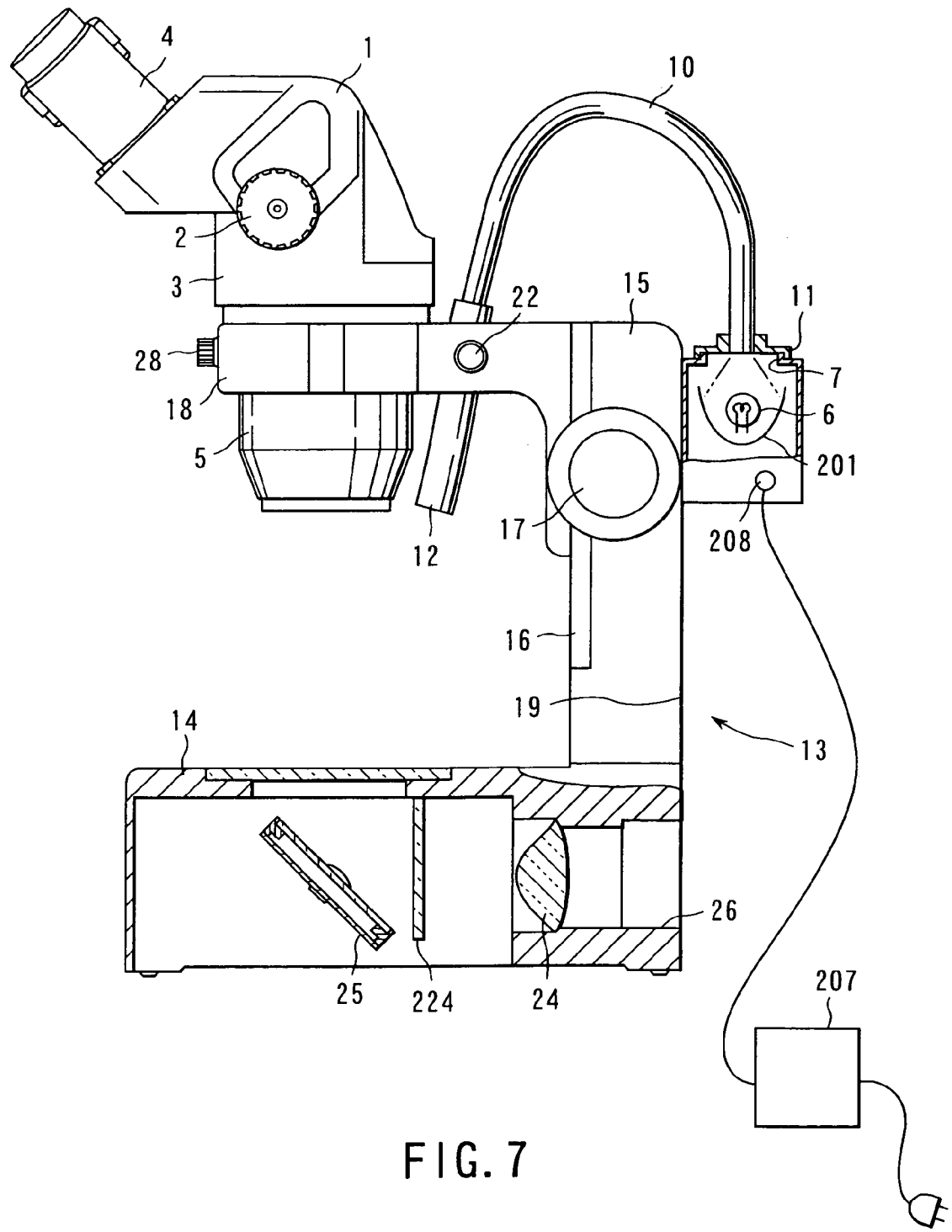
FIG. 7 is a side view showing another structure that the stereomicroscope according to the first embodiment may have.

The present invention is not limited to this embodiment, nonetheless. The light source unit 8 may be further miniaturized by separately disposing the power source substrate 205. As FIG. 7 illustrates, the light source unit 8 may be smaller if an AC adapter 207 is used instead of the power source substrate 205. The AC adapter 207 converts the power-supply, AC voltage to a DC voltage, which is applied to the light source unit 8 via a connector 208.

In the stereomicroscope described above, one light source unit 8 can be used as a light source for fiber illumination, transmitted illumination and oblique illumination. The microscope user can select any one of these illumination modes.

Figure 8:
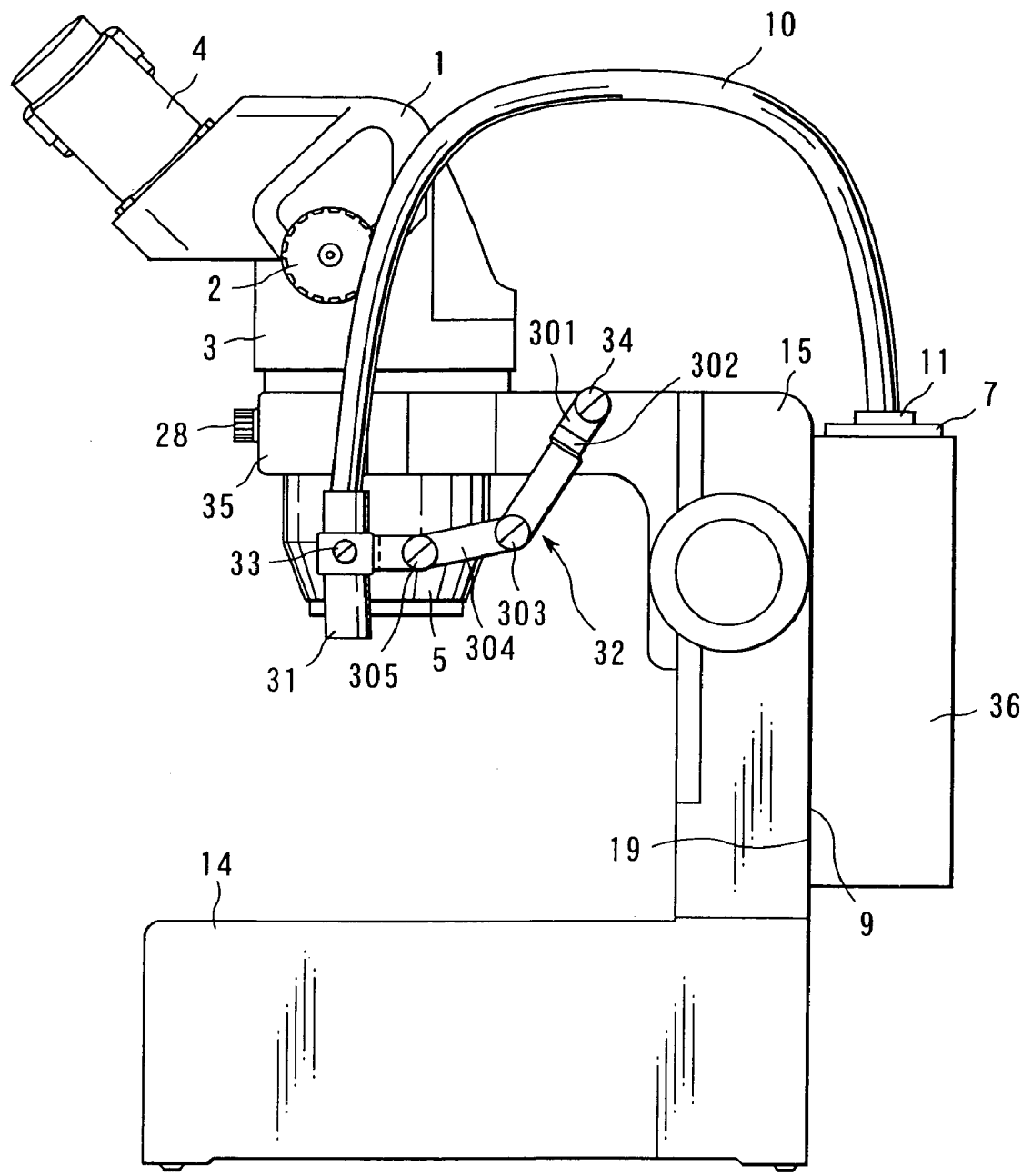
FIG. 8 is a side view explaining how a fiber illuminating apparatus performs oblique illumination in a stereomicroscope according to another embodiment of this invention.

FIG. 8 is a side view explaining how the fiber illuminating apparatus performs oblique illumination in the stereomicroscope according to a second embodiment of the present invention. Parts similar to those of the first embodiment are denoted at the same reference numerals and will not be described in detail.

A fiber tip end 31 holds the fiber such that the light beam emitted from the fiber travels in a desired direction is disposed in one end of the fiber 10. Moreover, a flexible arm 32 is provided in an arm portion 35 to set the axis of the fiber tip end 31 in the desired direction.

Figure 9:
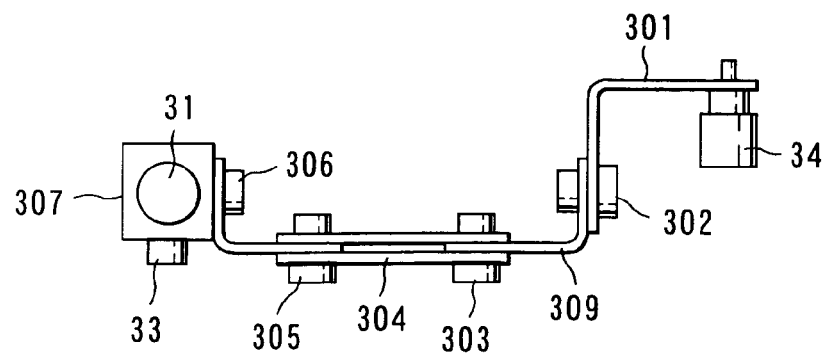
FIG. 9 is a diagram showing a flexible arm.

FIG. 9 is a diagram showing the flexible arm 32.

A fixing portion 34 is provided at one end of the flexible arm 32. An L-shaped arm member 301 is attached to the arm portion 35 and can rotate about the axis of the fixing portion 34. The arm member 301 and an L-shaped arm member 309 are mounted on a fixing portion 302 and can rotate about the axis of the fixing portion 302 which is the rotation axis. The respective arm members constituting the flexible arm 32 are connected to one another and can rotate about the axes of the fixing portions 302, 303, 305 and 306, respectively.

Moreover, an insertion portion 307 is attached to the other end of the flexible arm 32 and can be rotated by the fixing portion 306. The insertion portion 307 has an opening in which the fiber tip end 31 may be inserted and held by a fixing portion 33.

The fiber tip end 31 is thus secured to the flexible arm 32. The fiber tip end 31 can apply light to the sample (not shown) at an arbitrary angle, because the flexible arm 32 can be freely moved.

Various illuminating methods using the stereomicroscope of the second embodiment will be described.

FIG. 8 shows a method that uses the fiber illuminating apparatus to perform oblique illumination on the sample. The light source unit attaching portion 11 of the fiber 10 is attached to the fiber introducing portion 7 of a light source unit 36. The stand attaching portion 9 of the light source unit 36 is fixed in position after aligned with the mounting portion 19 of the support 15. The fiber tip end 31 is attached to the flexible arm 32 and fixed by the fixing portion 33. Then, the flexible arm 32 can move the fiber tip end 31 freely, by virtue of the structure specified above. The fiber tip end 31 can therefore be directed to the sample at any desired angle to illuminate the sample.

Figure 5:
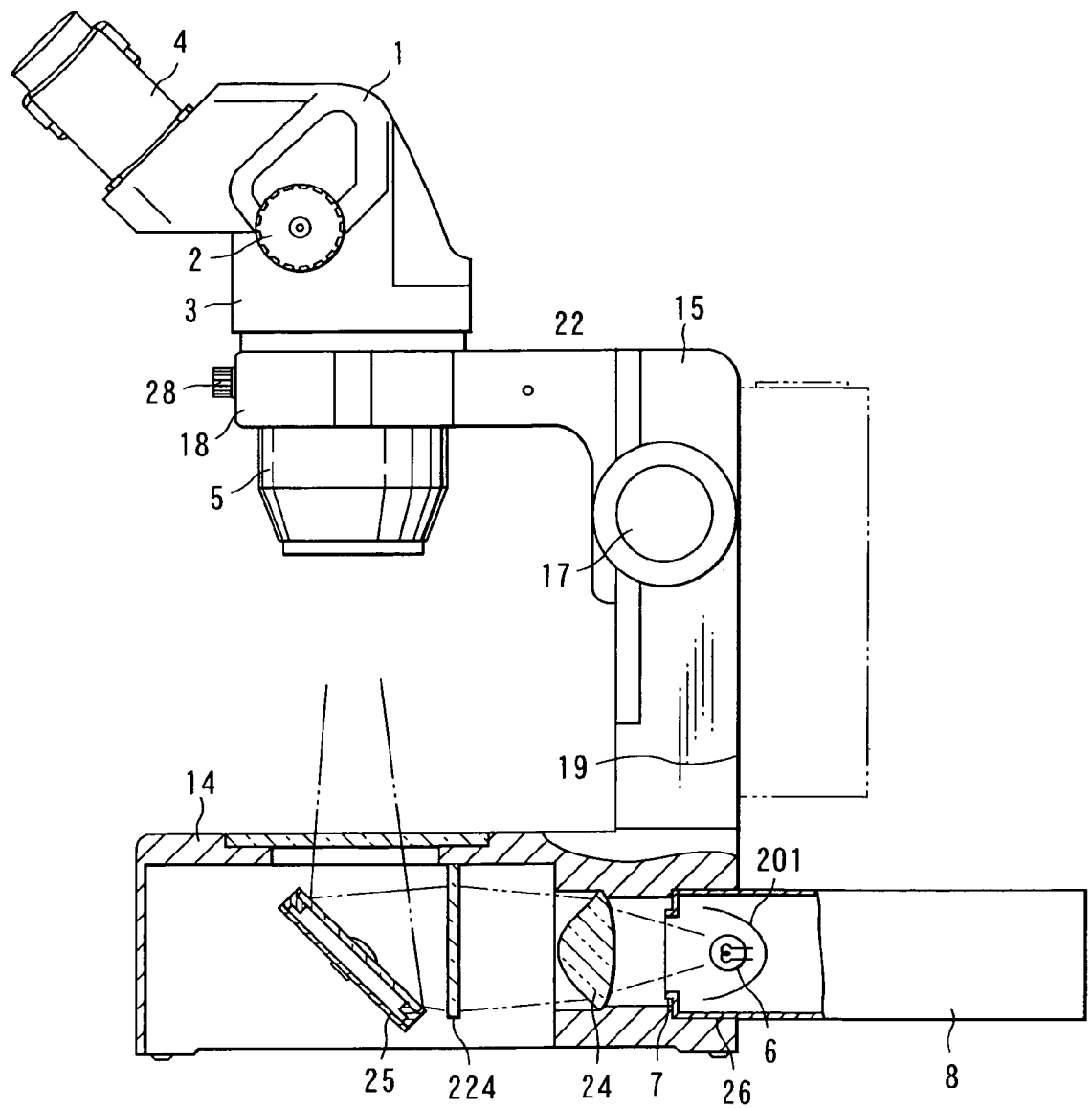
FIG. 5 is a side view showing another structure that the stereomicroscope according to the first embodiment may have.

The method of performing the transmitted illumination, using the light source 6 and not using the fiber 10, is similar to the method of the first embodiment shown in FIG. 5. Therefore, it will not be described.

Figure 10:
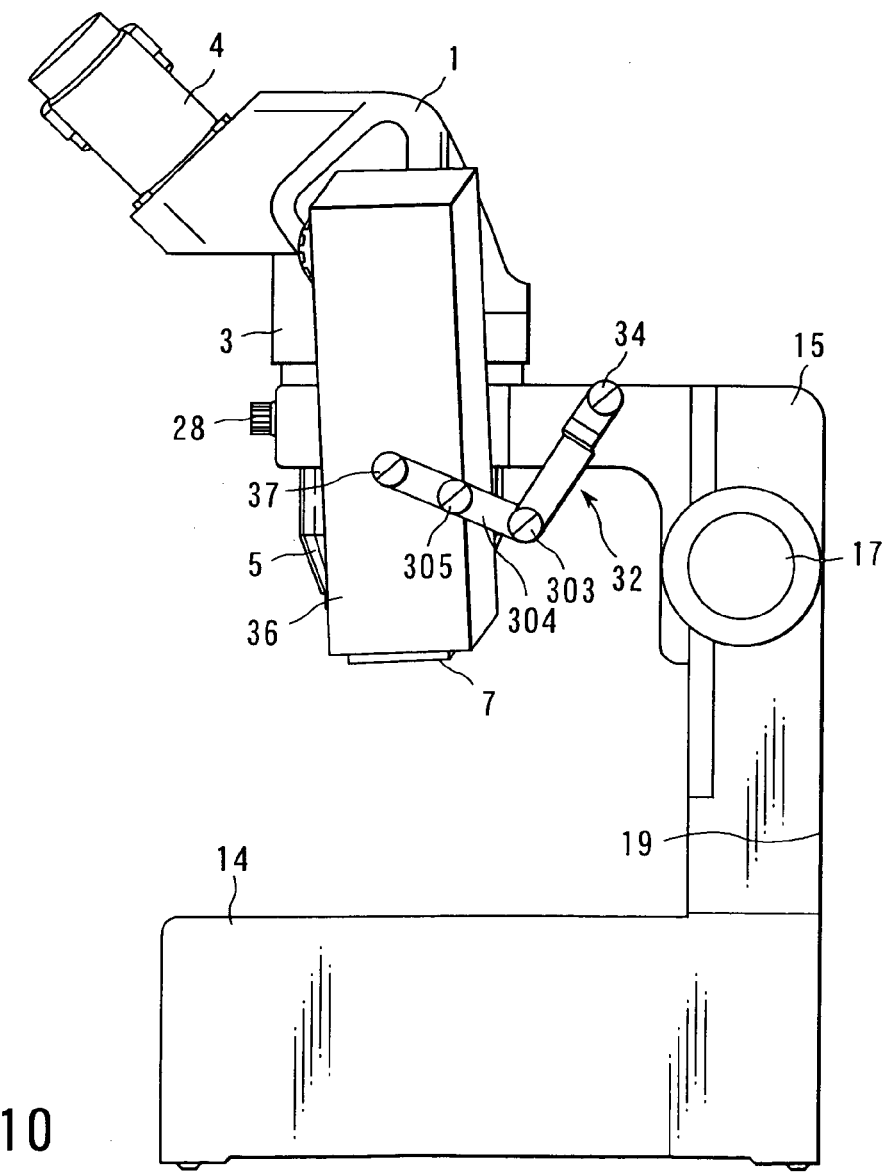
FIG. 10 is a side view explaining how an illuminating apparatus performs oblique illumination in a stereomicroscope according to another embodiment of the invention.

FIG. 10 depicts a method of performing oblique illumination, using the light source 6 and not using the fiber 10. The light source unit attaching portion 11 provided at the fiber end is removed from the fiber introducing portion 7 of the light source unit 36. A fixing portion 37 secures the light source unit 36 to the flexible arm 32. Then, the flexible arm 32 can move the light source unit 36 freely, owing to the above-described structure. Therefore, the sample can be illuminated with the light applied directly from the light source 6, at a desired angle to the sample.

The stereomicroscope described above attains an advantage similar to that of the first embodiment. Once the fiber tip end 31 and light source unit 36 are attached to the flexible arm 32, the optical axes of the fiber tip end 31 and light source unit 36 can be fixed in any desired directions.

Figure 11:
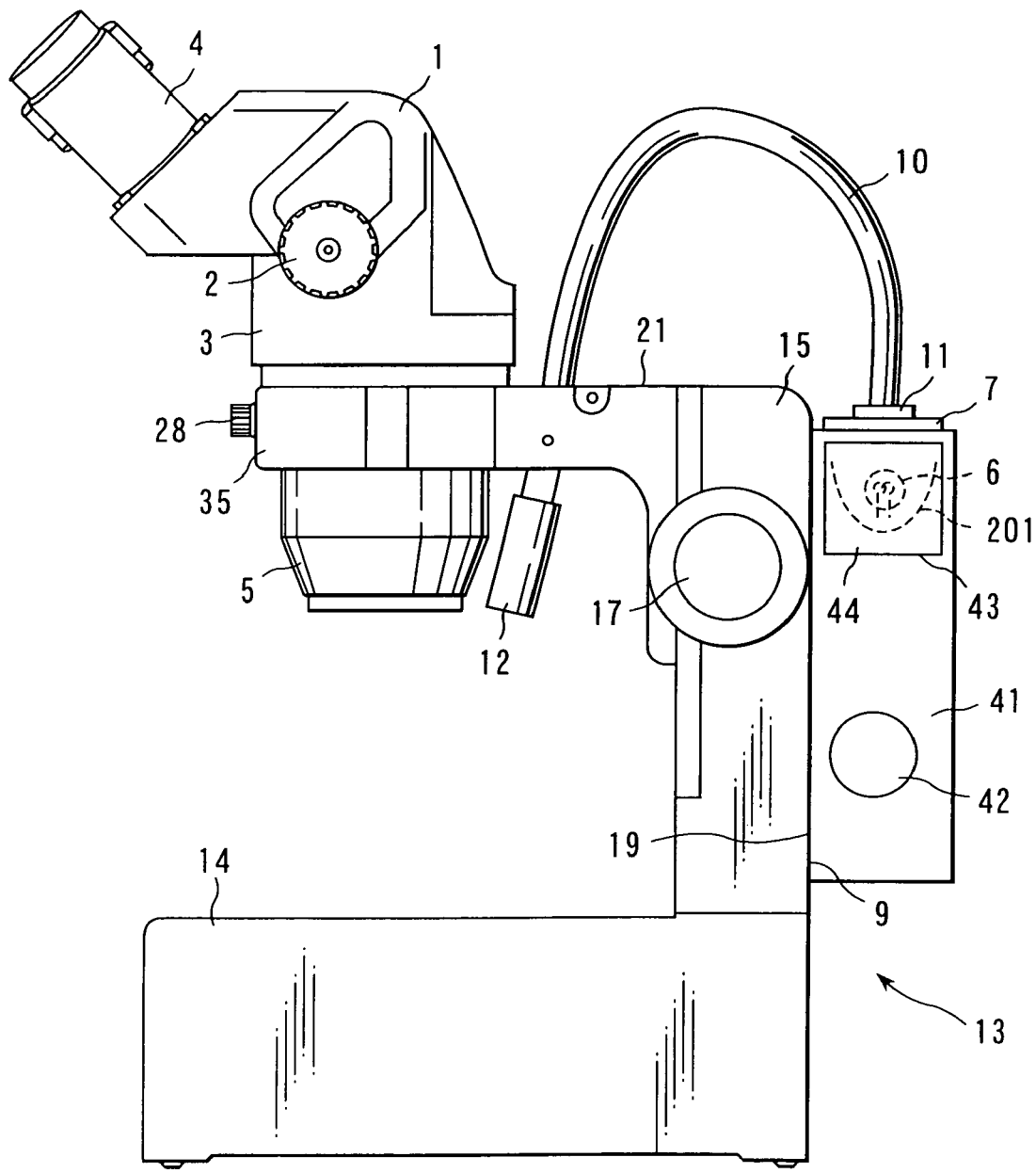
FIG. 11 is a side view explaining how a fiber illuminating apparatus performs oblique illumination in a stereomicroscope according to still another embodiment of this invention.

FIG. 11 is a side view showing the oblique illumination performed by the fiber illuminating apparatus that is incorporated in the stereomicroscope according to a third embodiment of this invention. The parts similar to those of the first embodiment are denoted at the same reference numerals, and will not be described in detail.

In the third embodiment, a light source unit 41 includes a light source 6, a light adjustment volume 42, and a lamp change portion 43. The light adjustment volume 42 adjusts the amount of light. The lamp change portion 43 is configured to replace a lamp with another. Screws (not shown) fasten a lid 44 is attached to the lamp change portion 43. The lid 44 can be removed to replace the lamp with another. The structure shown in FIG. 7 can be applied to the third embodiment. That is, the AC adapter 207 may be used to miniaturize the light source unit 41, instead of using the power source substrate 205 in the light source unit 41.

Various illuminating methods using the stereomicroscope of the third embodiment will be described.

FIG. 11 illustrates a method that uses the fiber illuminating apparatus to carry out oblique illumination on the sample. The light source unit attaching portion 11 of the fiber 10 is attached to the fiber introducing portion 7 of the light source unit 41. The stand attaching portion 9 of the light source unit 41 is aligned with and attached to the mounting portion 19 of the support 15. The fiber tip end 12 is inserted in the opening 21 made in the arm portion 18 of the stand 13. It is then adjusted and fixed, directing the fiber 10 to the sample.

The light adjustment volume 42 is incorporated in the light source unit 41, which is mounted on the back of the support 15. Hence, the light adjustment volume 42 can lie near the other operation portions, such as the focus handle 17 and zoom handle 2. Moreover, the light source unit 41 can be attached not only to the back of the support 15, but also to the left side, right side, front or back of the stand base portion 14. The light adjustment volume 42 and lamp change portion 43 can therefore be positioned in the vicinity of the microscope user's hands.

The method of performing transmitted illumination, by using the light source 6 and not using the fiber 10, is similar to the method of the first embodiment shown in FIG. 5. Therefore, it will not be described.

Figure 6:
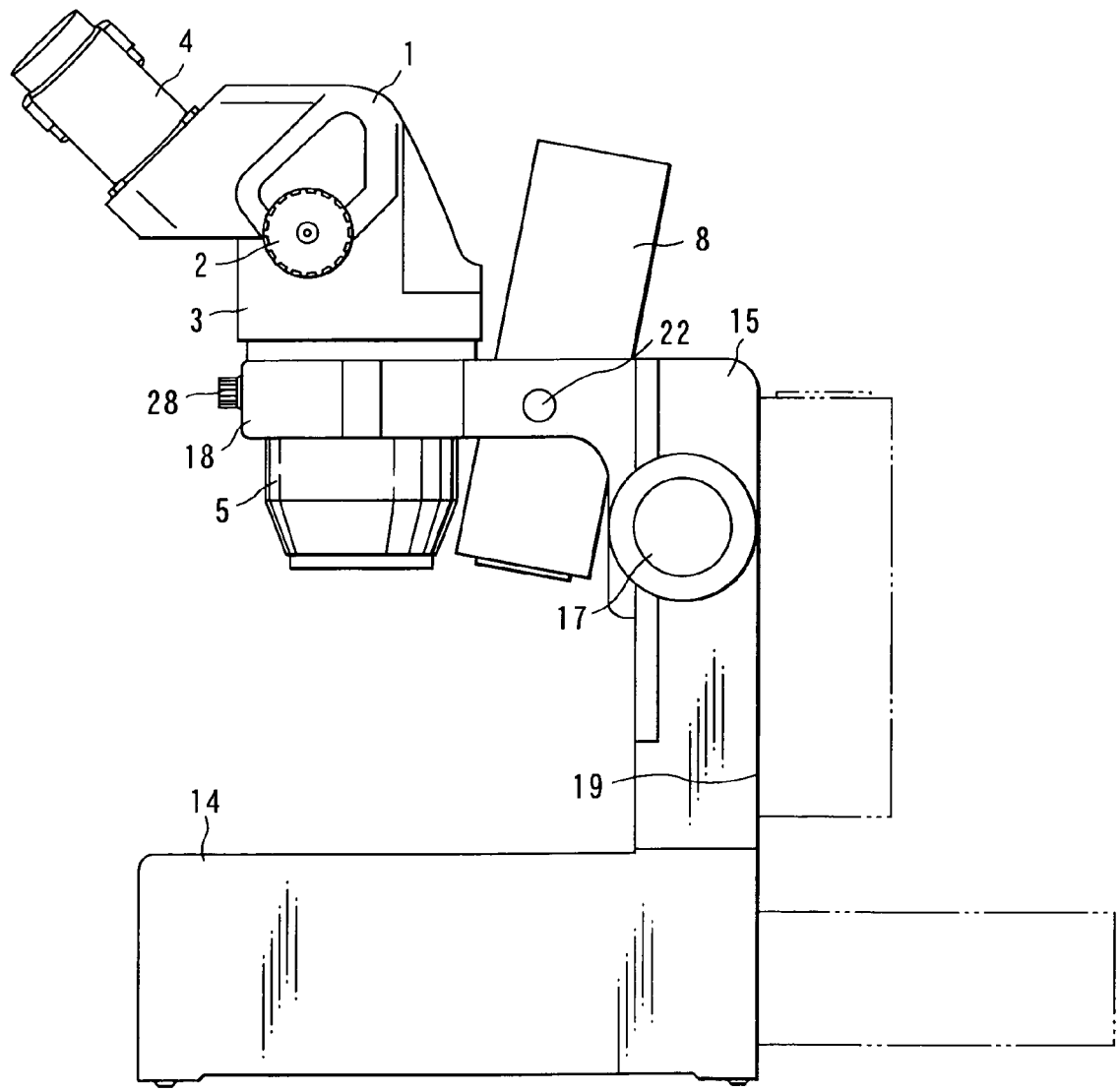
FIG. 6 is a side view illustrating still another structure that the stereomicroscope according to the first embodiment may have.

The method of performing oblique illumination, by using the light source 6 and not using the fiber 10, is similar to the method of the first embodiment shown in FIG. 6. Therefore, it will not be described.

The stereomicroscope described above can achieve an advantage similar to the advantage of the first embodiment. In addition, the stereomicroscope is improved in operability. This is because both the light adjustment volume 42 and the lamp change portion 43 can be provided near the focus handle 17 and zoom handle 2.

The present invention is not limited to the embodiments described above. According to the invention, the embodiments may be used in any appropriate combinations.

Moreover, the invention is applied not only to the stereomicroscopes of the above-described embodiments. It can also be applied to microscopes of general types. The invention can be applied to not only a stereomicroscope that has two objective lenses, but also a microscope that includes one single objective lens only.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stereomicroscope comprising:
   a stand including a support disposed vertically on a stand base portion on which a sample is to be placed;
   an arm portion connected to a focus adjust portion attached to the support so as to be vertically movable along the support;
   a microscope main body connected to the arm portion;
   a light source unit containing a light source lamp which illuminates the sample and which is attached to a back side of the support opposite a side to which the focus adjust portion is attached; and
   a fiber connected to the light source unit which guides illumination light from the light source unit to the sample from outside of the microscope main body.

2. The stereomicroscope according to claim 1, wherein the arm portion comprises an opening portion which enables a top end portion of the fiber to pass therethrough, and a holding portion which holds the fiber and adjusts a light beam emitted from the fiber in a desired direction.

3. The stereomicroscope according to claim 2, wherein the light source unit comprises a stand attaching portion attachable to the back side of the support.

4. The stereomicroscope according to claim 3, wherein the fiber is attachable to the light source unit.

5. The stereomicroscope according to claim 3, wherein the light source unit comprises a change portion configured to exchange the light source lamp with another lamp, and an adjustment portion which adjusts an amount of light emitted by the light source lamp.

6. The stereomicroscope according to claim 3, further comprising a power source adapter which supplies a DC voltage to the light source lamp.

7. The stereomicroscope according to claim 2, wherein the support comprises a mounting portion which enables the light source unit to be attached to the back side of the support.

8. The stereomicroscope according to claim 7, wherein the fiber is attachable to the light source.

9. The stereomicroscope according to claim 7, wherein the light source unit comprises a change portion configured to exchange the light source lamp with another lamp, and an adjustment portion which adjusts an amount of light emitted by the light source lamp.

10. The stereomicroscope according to claim 7, further comprising a power source adapter which supplies a DC voltage to the light source lamp.

11. The stereomicroscope according to claim 1, wherein the arm portion comprises a holding portion which holds the fiber and adjusts a light beam emitted from the fiber in a desired direction.

12. The stereomicroscope according to claim 11, wherein the light source unit comprises a stand attaching portion attachable to the back side of the support.

13. The stereomicroscope according to claim 12, wherein the fiber is attachable to the light source unit.

14. The stereomicroscope according to claim 12, wherein the light source unit comprises a change portion configured to exchange the light source lamp with another lamp, and an adjustment portion which adjusts an amount of light emitted by the light source lamp.

15. The stereomicroscope according to claim 12, further comprising a power source adapter which supplies a DC voltage to the light source lamp.

16. The stereomicroscope according to claim 11, wherein the support comprises a mounting portion which enables the light source unit to be attached to the back side of the support.

17. The stereomicroscope according to claim 16, wherein the fiber is attachable to the light source unit.

18. The stereomicroscope according to claim 16, wherein the light source unit comprises a change portion configured to enable exchange of the light source lamp with another lamp, and an adjustment portion which adjusts an amount of light emitted by the light source lamp.

19. The stereomicroscope according to claim 16, further comprising a power source adapter which supplies a DC voltage to the light source lamp.

20. The stereomicroscope according to claim 1, wherein the light source unit comprises a stand attaching portion attachable to the back side of the support.

21. The stereomicroscope according to claim 20, wherein the fiber is attachable to the light source unit.

22. The stereomicroscope according to claim 20, wherein the light source unit comprises a change portion configured to exchange the light source lamp with another lamp, and an adjustment portion which adjusts an amount of light emitted by the light source lamp.

23. The stereomicroscope according to claim 20, further comprising a power source adapter which supplies a DC voltage to the light source lamp.

24. The stereomicroscope according to claim 1, wherein the support comprises a mounting portion which allows the light source unit to be attached to the back side of the support.

25. The stereomicroscope according to claim 24, wherein the fiber is attachable to the light source unit.

26. The stereomicroscope according to claim 24, wherein the light source unit comprises a change portion configured to enable exchange of the light source lamp with another lamp, and an adjustment portion which adjusts an amount of light emitted by the light source lamp.

27. The stereomicroscope according to claim 24, further comprising a power source adapter which supplies a DC voltage to the light source lamp.

* * * * *